(12) United States Patent
Lee (10) Patent No.: US 10,949,044 B1
(45) Date of Patent: Mar. 16, 2021

(54) TOUCH STRUCTURE NOT AFFECTED BY CHANGES IN CAPACITANCE OF TOUCH ELECTRODE TO GROUND, TOUCH DEVICE USING SAME, AND METHOD FOR DRIVING TOUCH STRUCTURE

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Hsuan-Yun Lee, New Taipei (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 0 days.

(21) Appl. No.: 16/708,756

(22) Filed: Dec. 10, 2019

(30) Foreign Application Priority Data

Oct. 10, 2019 (CN) .......................... 201910958696.1

(51) Int. Cl.
*G06F 3/044* (2006.01)
*G06F 3/041* (2006.01)

(52) U.S. Cl.
CPC ...... *G06F 3/0445* (2019.05); *G06F 3/041662* (2019.05)

(58) Field of Classification Search
CPC . G06F 3/0041–0428; G06F 2203/0634; G06F 2203/04103–04113
See application file for complete search history.

(56) References Cited

U.S. PATENT DOCUMENTS

| 2015/0248183 | A1* | 9/2015 | Schwartz | G06F 3/0445 |
| | | | | 345/174 |
| 2017/0205913 | A1* | 7/2017 | Kimura | G06F 3/0416 |
| 2018/0196548 | A1* | 7/2018 | Kim | G06F 3/044 |
| 2018/0292930 | A1* | 10/2018 | Lee | G06F 3/044 |
| 2019/0348475 | A1* | 11/2019 | Park | G06F 3/0412 |

* cited by examiner

*Primary Examiner* — Sanghyuk Park
(74) *Attorney, Agent, or Firm* — ScienBiziP, P.C.

(57) ABSTRACT

A touch structure which is immune to variations in capacitance of a touch electrode to ground includes touch electrodestouch electrodes, auxiliary electrodes, and a driving circuit. The driving circuit drives the auxiliary electrodes with the same driving signal as the touch electrodes but does not read changes in capacitance of the auxiliary electrodes when determining touch events. A touch device using the touch structure and a method for driving the touch structure are also disclosed.

8 Claims, 10 Drawing Sheets

TOUCH STRUCTURE NOT AFFECTED BY CHANGES IN CAPACITANCE OF TOUCH ELECTRODE TO GROUND, TOUCH DEVICE USING SAME, AND METHOD FOR DRIVING TOUCH STRUCTURE

FIELD

The subject matter herein generally relates to human interface devices, specifically a touch structure, a touch device using the touch structure and a method for driving the touch structure.

BACKGROUND

In a self-capacitive touch device, when a conductive object (e.g., a finger) approaches a touch electrode of the device, a self-capacitance of the touch electrode changes as a result of parallel connection of a capacitance of the finger to the ground and a capacitance of the touch electrode to the ground.

However, the capacitance of the touch electrode to the ground is often not a fixed value due to the influence of the environment. For example, due to different ways of holding the touch device, electromagnetic interference from nearby circuit signals, etc., the value of the capacitance of the touch electrode to the ground constantly changes, forming noise in signals received by the drive circuit (touch chip), and affecting an accuracy of the detection of the value of the capacitance of the finger to the ground. In addition, the sensitivity deteriorates because a threshold value for determining the touch signal is increased due to the higher proportion of noise.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

Figure 1:
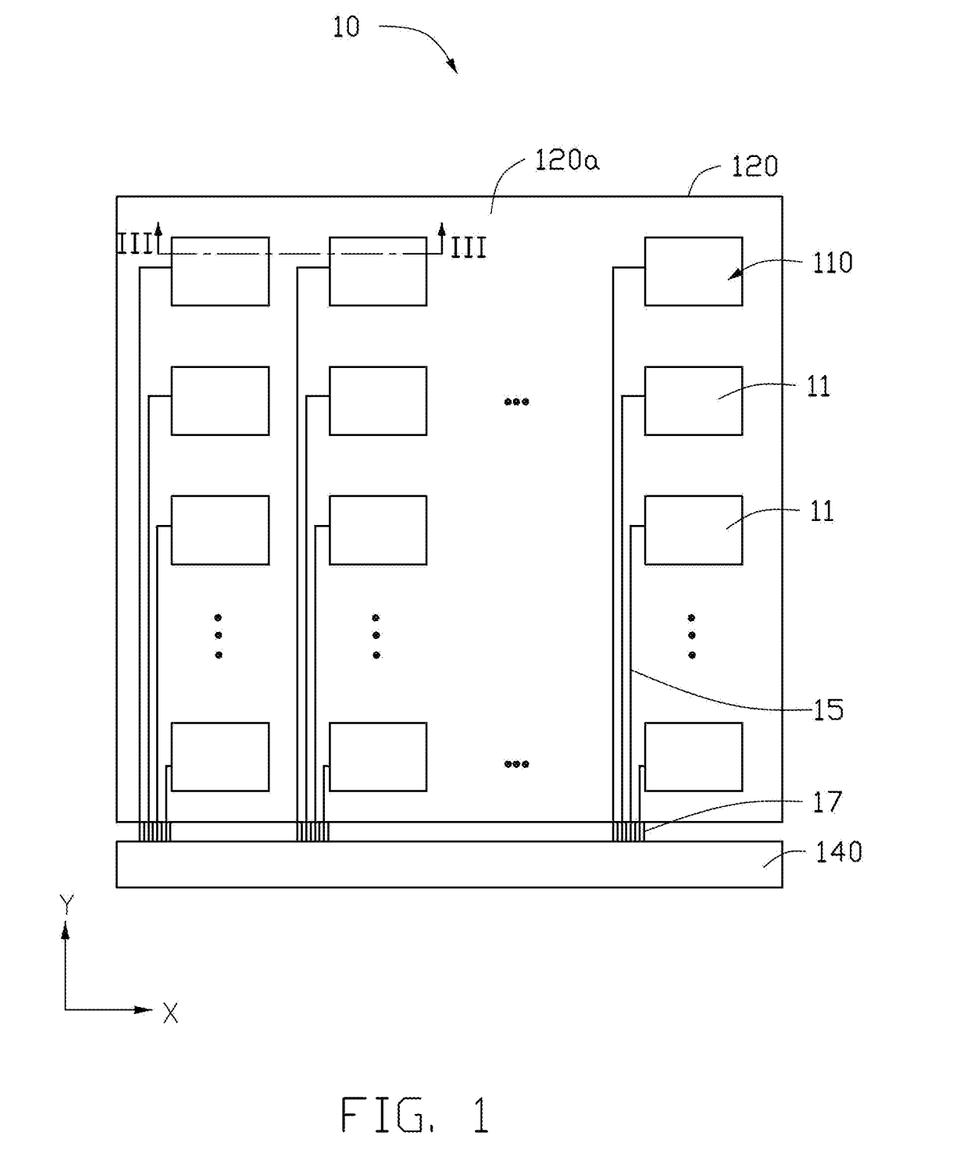
FIG. 1 is a top view of a touch structure according to a first embodiment.

Touch Structure in a First Embodiment:

FIG. 1 shows a touch structure 10 according to a first embodiment. In FIG. 1, the touch structure 10 includes an insulating layer 120, a touch electrode layer 110, a plurality of first leads 15, a plurality of second leads 17, and a driving circuit 140. The insulating layer 120 has a first surface 120a. The touch electrode layer 110 and the first leads 15 are on the first surface 120a of the insulating layer 120. The touch electrode layer 110 includes a plurality of touch electrodes 11 which are spaced and insulated from each other. The touch electrodes 11 are arranged in a matrix including a plurality of rows along a first direction X and a plurality of columns along a second direction Y. The first direction X intersects with the second direction Y. Each touch electrode 11 is electrically connected to the driving circuit 140 by one first lead 15. The first leads 15 electrically connected to the touch electrodes 11 in each column are not equal in length. In the first direction X, lengths of the first leads 15 are gradually shortened. Each first lead 15 electrically connects to one touch electrode 11, extends in the first direction X and extends in the second direction Y to be connected to the driving circuit 140. In other embodiments, the first leads 15 electrically connected to the touch electrodes 11 of the first row may be routed along the periphery of the touch structure 10 instead of being routed between adjacent columns of touch electrodes 11.

Figure 2:
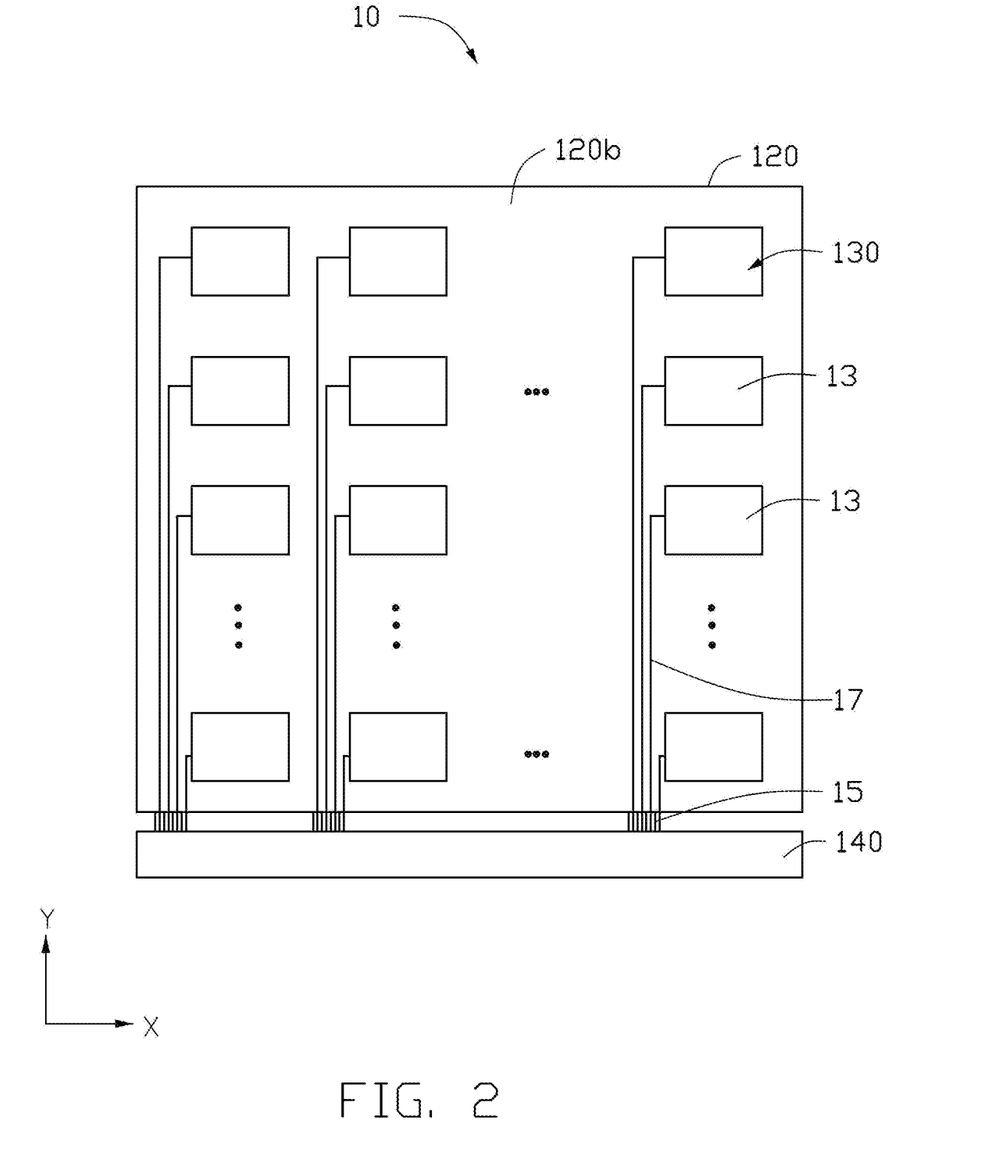
FIG. 2 is a bottom view of the touch structure in FIG. 1.

In FIG. 2, the touch structure 10 further includes an auxiliary electrode layer 130. The insulating layer 120 has a second surface 120b opposite to the first surface 120a. The auxiliary electrode layer 130 and the second leads 17 are on the second surface 120b. The auxiliary electrode layer 130 includes a plurality of auxiliary electrodes 13 which are spaced and insulated from each other. The auxiliary electrodes 13 are arranged in a matrix including a plurality of rows in the first direction X, and a plurality of columns in the second direction Y. Each auxiliary electrode 13 is electrically connected to the driving circuit 140 through one second lead 17. The second leads 17 electrically connected to the auxiliary electrodes 13 in each column are not equal in length. In the first direction X, lengths of the second leads 17 are gradually shortened. Each second lead 17 electrically connects to one auxiliary electrode 13, extends in the first direction X and extends in the second direction Y to be connected to the driving circuit 140. In other embodiments, the second leads 17 electrically connected to the auxiliary electrodes 13 of the first row may be routed along the periphery of the touch structure 10 instead of being routed between adjacent columns of auxiliary electrodes 13.

In FIGS. 1 and 2, a number and positions of the touch electrodes 11 are in one-to-one correspondence with a number and positions of the auxiliary electrodes 13. A shape of each auxiliary electrode 13 and each touch electrode 11 are both rectangular. In other embodiments, the shape of each auxiliary electrode 13 and each touch electrode 11 may be a diamond shape, a zigzag shape, a triangle shape, or the like.

Figure 3:
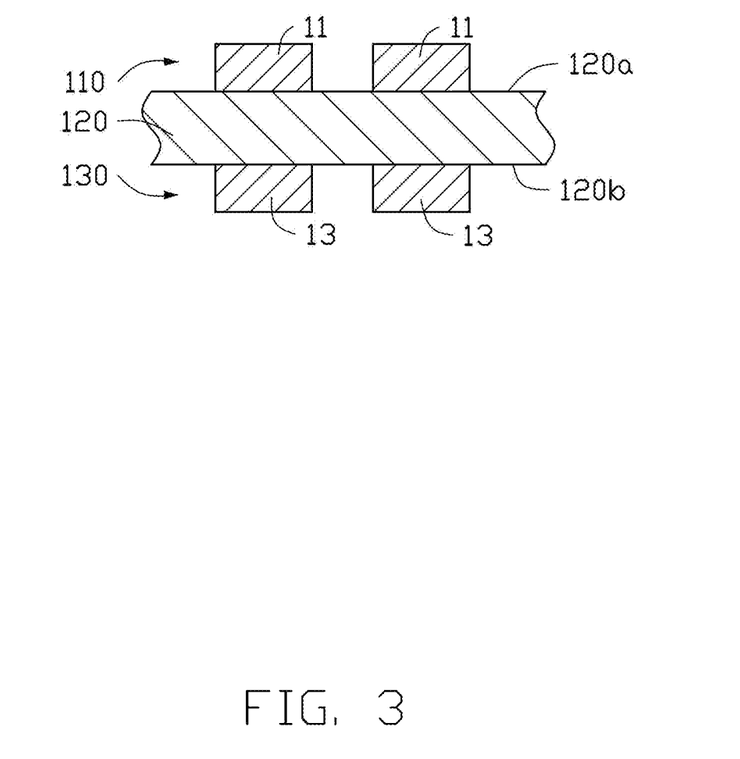
FIG. 3 is a cross-sectional view along line of FIG. 1.

In FIG. 3, each touch electrode 11 corresponds to one auxiliary electrode 13, and a projection of each touch electrode 11 along the normal direction of the insulating layer 120 on the insulating layer 120 and a projection of the auxiliary electrode 13 corresponding thereto along the normal direction of the insulating layer 120 on the insulating layer 120 completely overlap. In one embodiment, the touch electrode layer 110 and the auxiliary electrode layer 130 may be made of indium tin oxide, metal mesh, nano silver, graphene, copper or aluminum, or a metal alloy.

In one embodiment, the insulating layer 120 is a composite substrate. The composite substrate may be made of polycarbonate (PC), polymeric methyl methacrylate (PMMA), polyethylene glycol terephthalate (PET) or colorless polyimide (CPI), etc. In other embodiments, the insulating layer 120 may be air, to achieve a floating touch. That is, each self-capacitance touch electrode 11 and one auxiliary electrode 13 are electrically insulated by air.

In one embodiment, a thickness of the insulating layer 120 may be 20 μm, 50 μm, 1 mm, 1.2 mm, 5 mm, 10 mm, 15 mm, or the like. The auxiliary electrodes 13 and the touch electrodes 11 may be a square having a side length of 20 mm, 60 mm, or the like.

In one embodiment, the touch structure may further include a non-conductor protective layer on a side of the touch electrode layer 110 away from the insulating layer 120, to protect the touch electrodes 11 from oxidation or from being scratched by a conductive object (e.g., a finger). The touch structure may further include a non-conductor protective layer on a side of the auxiliary electrode layer 130 away from the insulating layer 120 to protect the auxiliary electrodes 13.

In the touch structure 10, the plurality of touch electrodes 11 form a single-layer self-capacitive touch electrode. The driving circuit 140 is configured to drive the touch electrodes 11 to detect changes of self-capacitance of the touch electrodes 11 and to thereby determine touch positions. When a conductive object (e.g., a finger) touches a certain point of the touch structure 10, the changes of self-capacitance of the touch electrodes 11 are received and processed by the driving circuit 140. By processing and calculating the changes of self-capacitance, coordinates of the touch position can be determined.

In one embodiment, the driving circuit 140 is further configured to drive the auxiliary electrodes 13 with the same driving signal as the touch electrodes 11, but is not configured to read the signals of the auxiliary electrodes 13. That is, the driving circuit 140 drives the touch electrodes 11 and the auxiliary electrodes 13 corresponding to the touch electrodes 11 with the same driving signal, but only reads the changes of the self-capacitance of the touch electrodes 11 without reading the signals of the auxiliary electrodes 13. The determination of touch positions is only related to the signals of the touch electrodes 11, and is independent of the signals of the auxiliary electrodes 13. In one embodiment, the driving circuit 140 is a touch chip.

Figure 4:
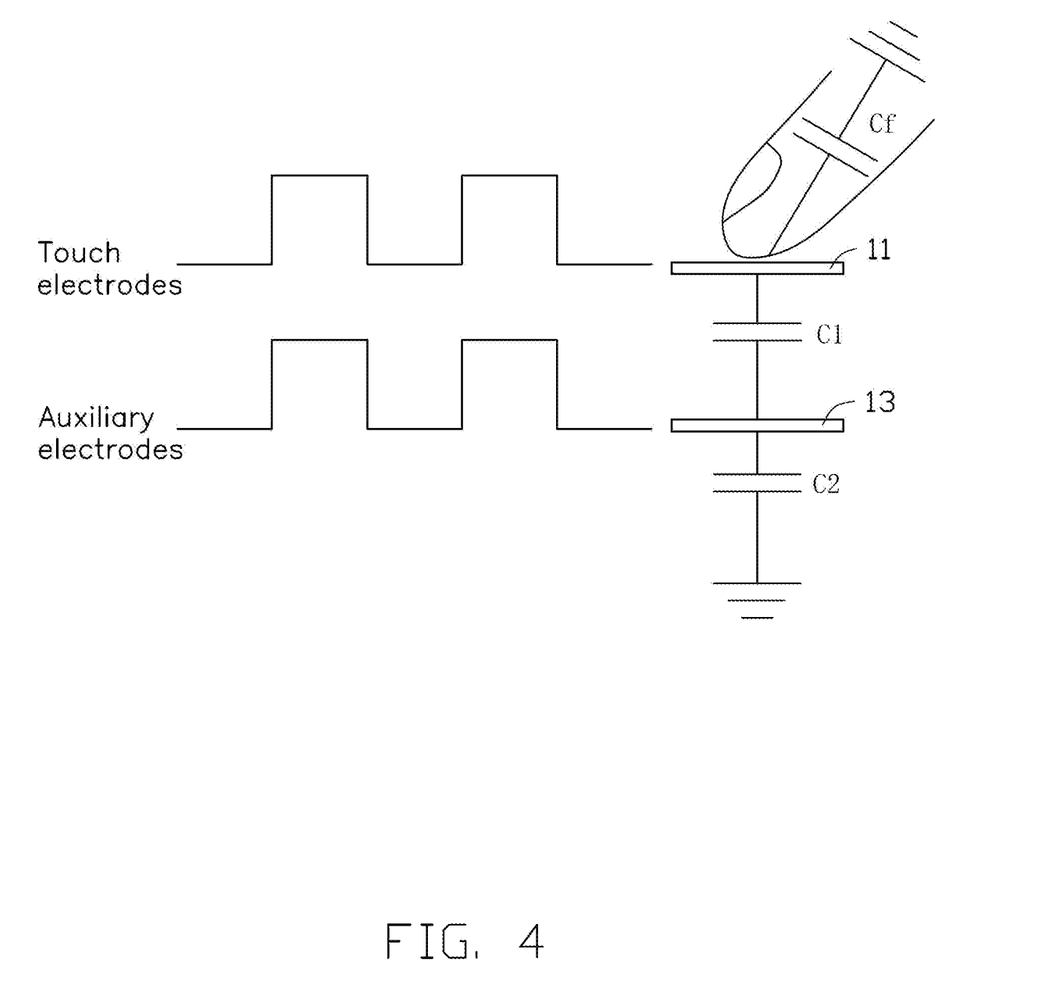
FIG. 4 is a schematic diagram of the driving process of the touch structure in FIG. 1.

In FIG. 4, during a touch period, the driving circuit 140 drives one touch electrode 11 and the auxiliary electrode 13 corresponding to the touch electrode 11 with the same driving signal (e.g., a square wave). When a conductive object (e.g., a finger) approaches the touch electrode 11, the self-capacitance C of the touch electrode 11 is a result of parallel connection formed of a finger-to-ground capacitance Cf and a capacitance C1 between the touch electrode 11 and the auxiliary electrode 13. That is, C=Cf+C1. The signal of the auxiliary electrode 13 is a capacitance C2 of the auxiliary electrode 13 to the ground. The capacitance C2 of the auxiliary electrode 13 to the ground is often not a fixed value due to the influence of the environment. For example, different ways of holding or orientation of the touch device using the touch structure 10, electromagnetic interference (EMI) from nearby circuit signals, etc. The value of the capacitance C2 of the auxiliary electrode 13 to the ground to constantly changes, forming noise in signals received by the driving circuit 140, affecting an accuracy of the detection of the value of the self-capacitance of the touch electrode 11. Sensitivity also deteriorates because a threshold value for determining the touch signal is increased due to higher proportion of noise.

In the touch structure 10, the driving circuit 140 reads only the self-capacitance C of the touch electrode 11 (i.e., Cf+C1), and does not read the signal C2 of the auxiliary electrode 13. That is, the signal C2 of the auxiliary electrode 13 does not belong to the self-capacitance C of the electrode 11. In the touch structure 10, since the driving signals received by the auxiliary electrode 13 and the touch electrode 11 are the same, the touch electrode 11 and the auxiliary electrode 13 corresponding thereto have the same electrical potential all the time. That is, at any time, a voltage difference between the touch electrode 11 and the auxiliary electrode 13 corresponding thereto is zero, and the capacitance C1 between the touch electrode 11 and the auxiliary electrode 13 corresponding thereto is zero. Therefore, the self-capacitance of the touch electrode 11 detected by the driving circuit 140 is C=Cf+C1=Cf+0=Cf That is, in the touch structure 10, the self-capacitance C of the touch electrode 11 read by the driving circuit 140 is purely and exclusively the finger-to-ground capacitance Cf, and does not include the noise component of the auxiliary electrode 13 to the ground capacitance C2. Therefore, the driving circuit 140 of the touch structure 10 reads the change of the capacitance from the finger to the ground, and does not include the noise of the auxiliary electrode 13 to the ground, so that the capacitance or changed capacitance of the auxiliary electrode 13 to the ground does not affect the self-capacitance. As a result of the detection, the touch structure 10 has a high accuracy. In addition, since the noise in the signal read by the driving circuit 140 of the touch structure 10 is reduced, the threshold of the touch signal can be lowered, so the touch structure 10 has a high sensitivity.

Figure 5:
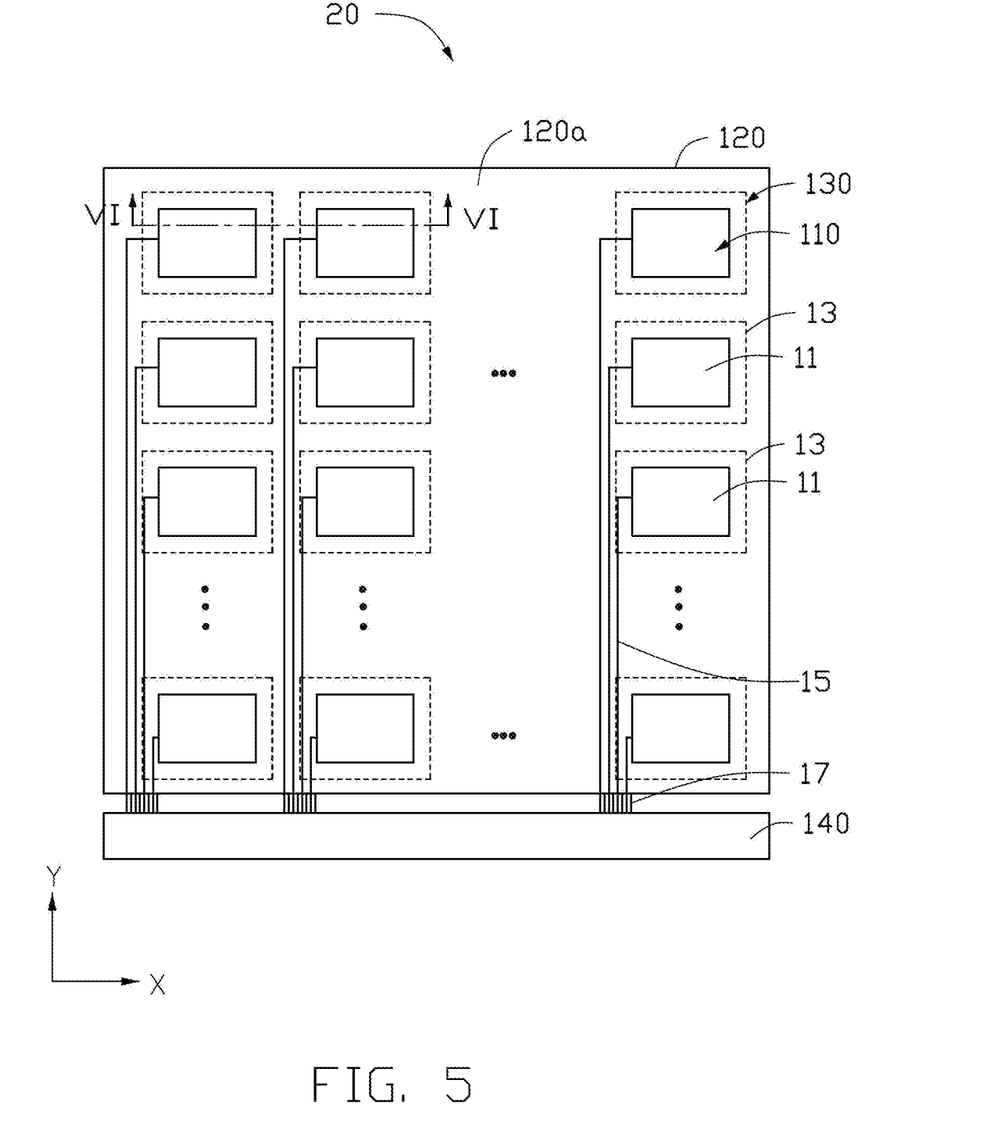
FIG. 5 is a planar view of the touch structure according to a second embodiment.
Figure 6:
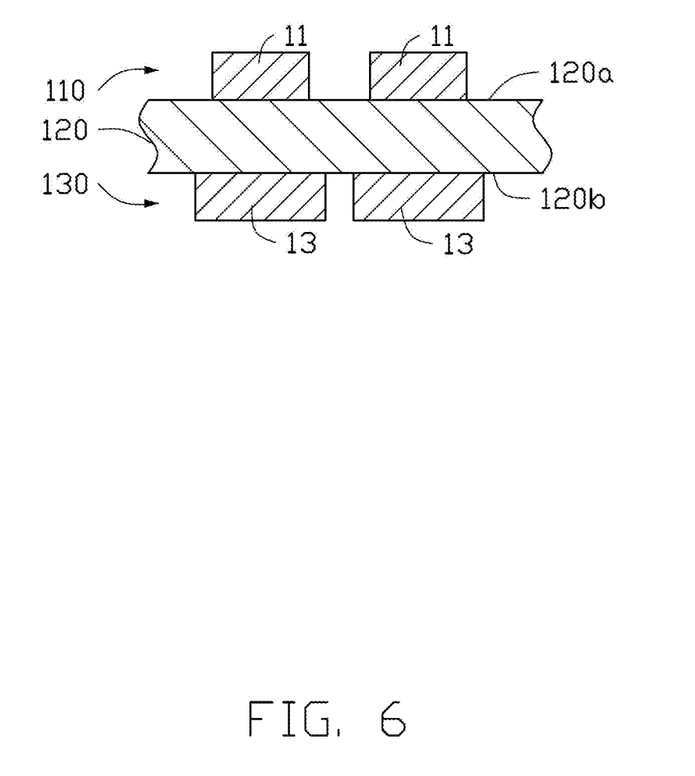
FIG. 6 is a cross-sectional view along line VI-VI of FIG. 5.

Touch Structure in a Second Embodiment:

In FIGS. 5 and 6, the touch structure 20 of the second embodiment differs from the touch structure 10 of the first embodiment as follows: in the first embodiment, the projection of each touch electrode 11 along the normal direction of the insulating layer 120 on the insulating layer 120 and the projection of the auxiliary electrode 13 corresponding thereto along the normal direction of the insulating layer 120 on the insulating layer 120 are completely overlapped. In this second embodiment, the projection of each touch electrode 11 along the normal direction of the insulating layer 120 on the insulating layer 120 and the projection of the auxiliary electrode 13 corresponding thereto along the normal direction of the insulating layer 120 on the insulating layer 120 partially overlap. An area of each touch electrode 11 is smaller than an area of the corresponding auxiliary electrode 13. The projection of each touch electrode 11 along the normal direction of the insulating layer 120 on the insulating layer 120 falls within the projection of the corresponding auxiliary electrode 13 along the normal direction of the insulating layer 120 on the insulating layer 120.

Figure 7:
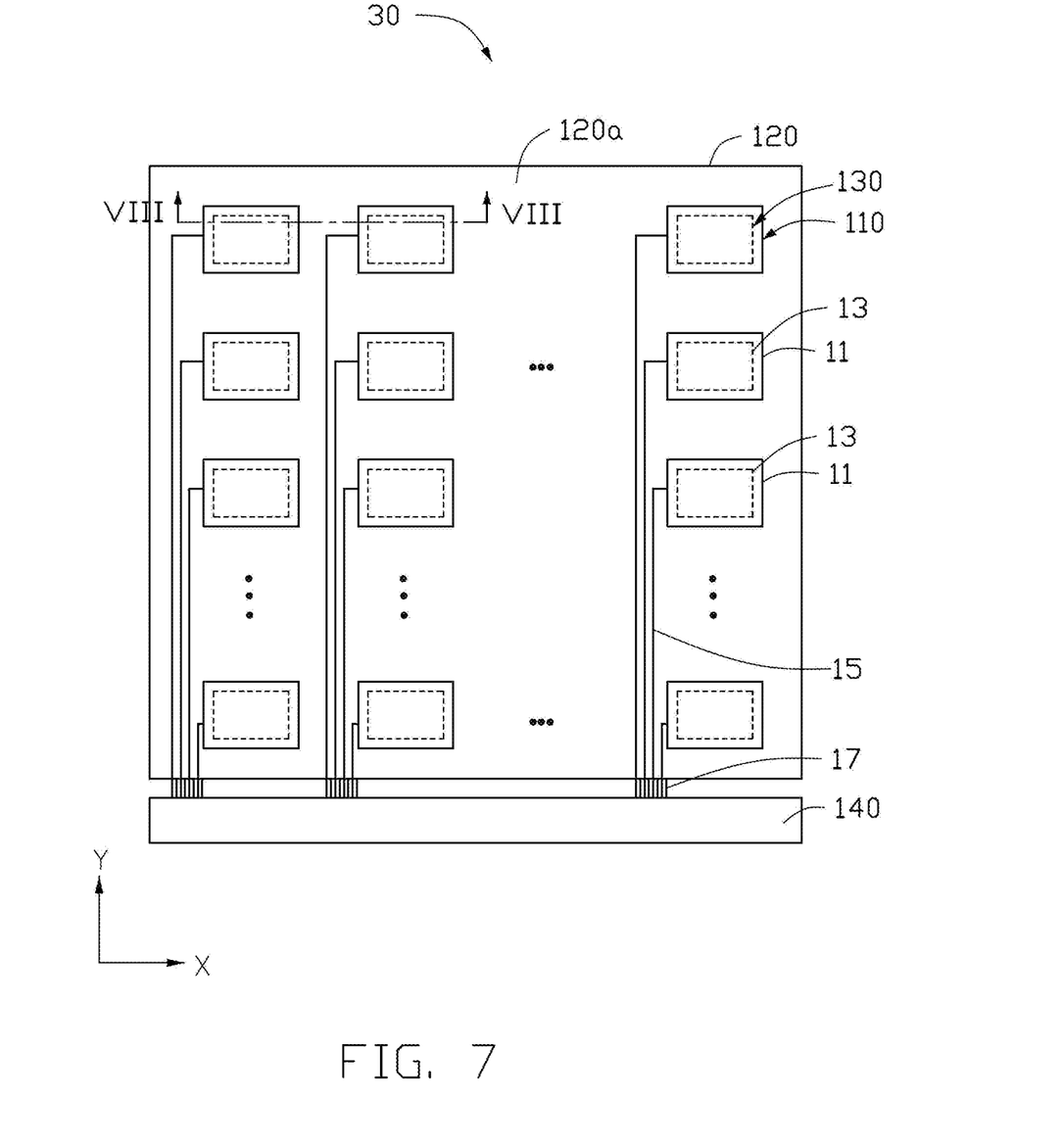
FIG. 7 is a planar view of the touch structure according to a third embodiment.
Figure 8:
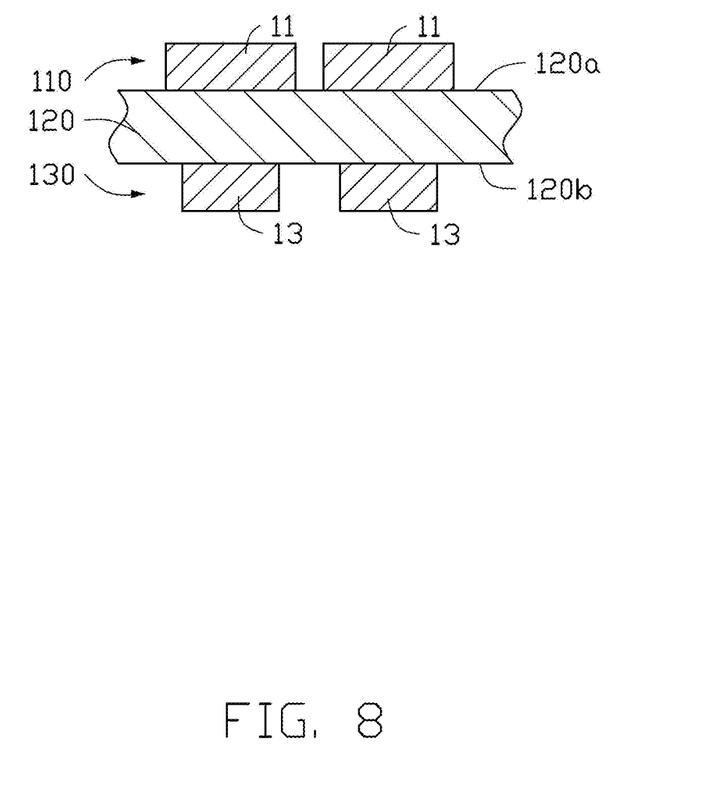
FIG. 8 is a cross-sectional view along line VIII-VIII of FIG. 7.

Touch Structure in a Third Embodiment:

In FIGS. 7 and 8, the touch structure 30 of the third embodiment differs from the touch structure 10 of the first embodiment as follows: in the first embodiment, the projection of each touch electrode 11 along the normal direction of the insulating layer 120 on the insulating layer 120 and the projection of the auxiliary electrode 13 corresponding thereto along the normal direction of the insulating layer 120 on the insulating layer 120 are completely overlapped. In this third embodiment, the projection of each touch electrode 11 along the normal direction of the insulating layer 120 on the insulating layer 120 and the projection of the auxiliary electrode 13 corresponding thereto along the normal direction of the insulating layer 120 on the insulating layer 120 partially overlap. An area of each touch electrode 11 is larger than an area of the corresponding auxiliary electrode 13. The projection of each touch electrode 11 along the normal direction of the insulating layer 120 on the insulating layer 120 completely covers the projection of the corresponding auxiliary electrode 13 along the normal direction of the insulating layer 120 on the insulating layer 120.

In one embodiment, a method for driving the touch structure 10 (20, 30) is also provided. The driving method includes the driving circuit 140 scanning the plurality of touch electrodes 11 in a self-capacitance manner, and detecting changes in the self-capacitance of the touch electrodes 11 to determine the touch positions. When the driving circuit 140 applies a driving signal to the touch electrode 11, the auxiliary electrode 13 corresponding to the touch electrode 11 being driven is simultaneously applied with the same driving signal by the driving circuit 140, but the driving circuit 140 does not read the signal of the auxiliary electrode 13. In the driving method of the disclosure, the change of the capacitance of the conductive object (e.g., a finger) to the ground read by the driving circuit 140 does not include noise of the capacitance of the auxiliary electrode 13 to the ground, so that the capacitance of the auxiliary electrode 13 to the ground does not affect the detection result of the self-capacitance, so that the touch structure 10 (20, 30) has a high accuracy. In addition, since the noise in the signal read by the driving circuit 140 of the touch structure 10 (20, 30) is reduced, the threshold of the touch signal is lowered, thereby the touch structure 10 (20, 30) has a high sensitivity.

Figure 9:
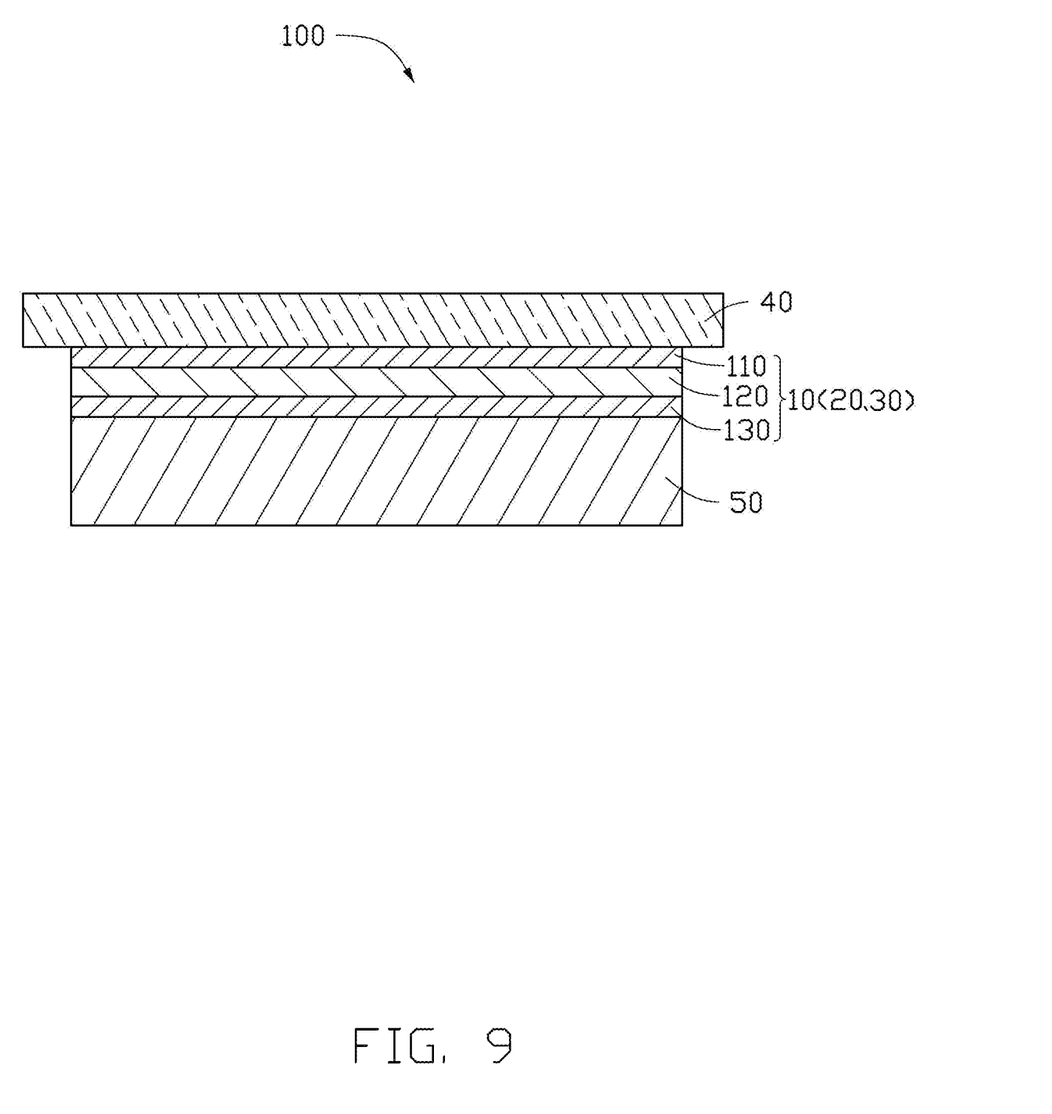
FIG. 9 is a cross-sectional view of a touch device according to a first embodiment.

Touch Device in a First Embodiment:

In FIG. 9, the touch device 100 includes a cover 40, a display panel 50, and the touch structure 10 (20, 30) between the cover 40 and the display panel 50. The touch electrode layer 110 is on the surface of the cover 40 adjacent to the display panel 50. The auxiliary electrode layer 130 is closer to the display panel 50 than the touch electrode layer 110. That is, the cover 40 and the touch structure 10 (20, 30) are combined to form a one glass solution (OGS).

The display panel 50 is for displaying images. The touch structure 10 (20, 30) is configured for a user to touch. When a conductive object (e.g., a finger) touches a position of the touch panel 10 corresponding to the touch structure 10 (20, 30), the self-capacitance at this position changes, and the changes of self-capacitance of the touch electrodes 11 are received and processed by the driving circuit 140. By processing and calculating the changes of self-capacitance, the coordinates of the touch position can be determined. In one embodiment, the display panel 50 may be a liquid crystal display panel, a light emitting diode (LED) display panel, or an organic light emitting diode (OLED) display panel. The touch device 100 may be a mobile phone, a tablet computer, a notebook computer, a navigator, or the like.

Figure 10:
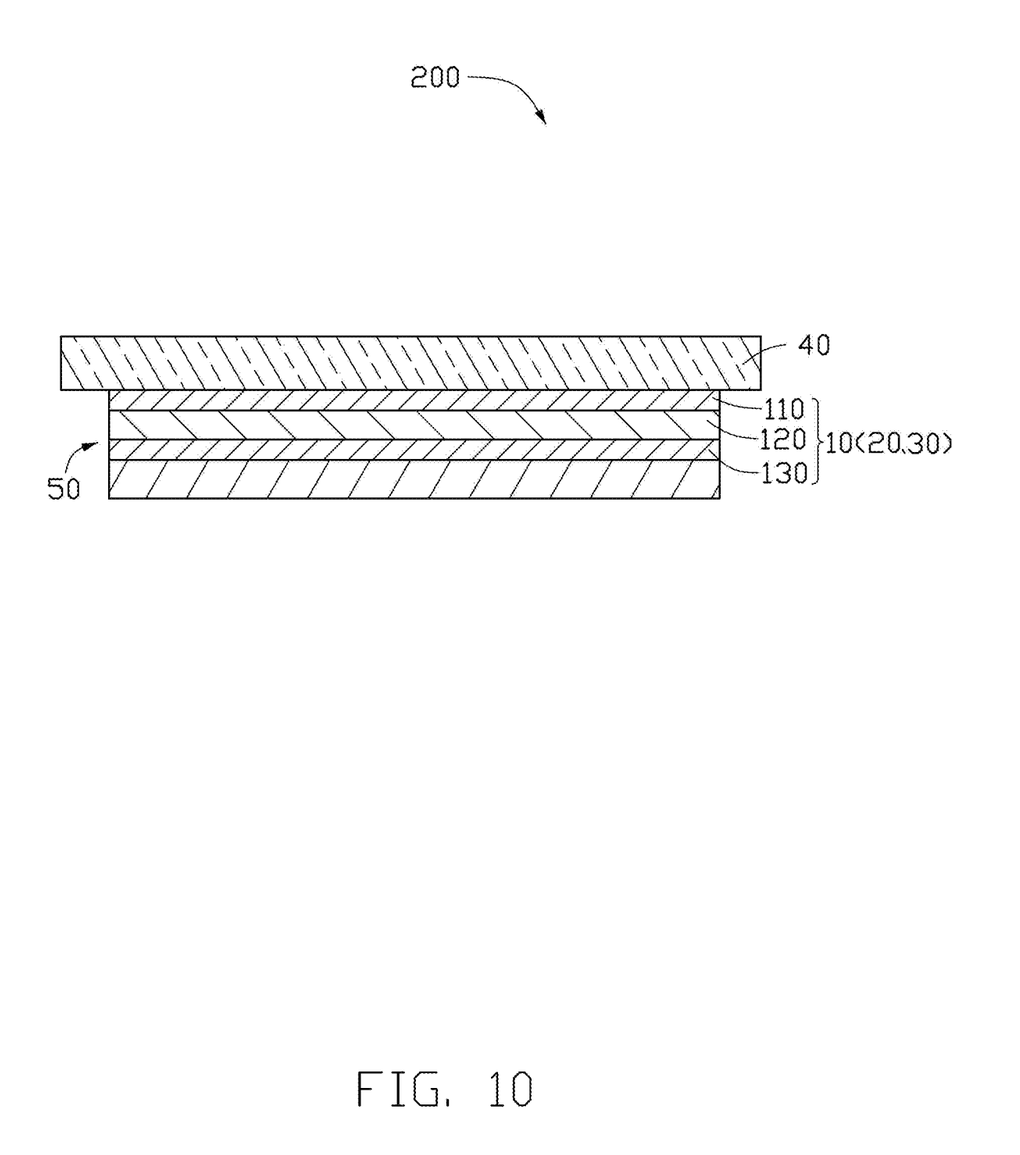
FIG. 10 is a cross-sectional view of the touch device according to a second embodiment.

Touch Device in a Second Embodiment:

In FIG. 10, the touch device 200 includes a cover 40 and a display panel 50 on a side of the cover 40. The touch structure 10 (20, 30) is embedded in the display panel 50. That is, the touch device 200 is an In-Cell touch device. The display panel 50 displays images. The touch structure 10 (20, 30) is configured for a user to apply touches. When a conductive object (e.g., a finger) touches a position of the touch panel 10 corresponding to the touch structure 10 (20, 30), the self-capacitance at this position changes, and the changes of self-capacitance of the touch electrodes 11 are received and processed by the driving circuit 140. By processing and calculating the changes of self-capacitance, the coordinates of the touch position can be determined.

The display panel 50 may be a liquid crystal display panel, a micro light emitting diode display panel, an organic light emitting diode display panel, or the like. In one embodiment, the display panel 50 is a liquid crystal display panel including an array substrate (not shown) and a color filter substrate (not shown). The touch structure 10 (20, 30) is embedded in the array substrate. The touch device 200 may be a mobile phone, a tablet computer, a notebook computer, a navigator, or the like.

Touch Structure in a Third Embodiment:

The touch structure 10 (20, 30) is not limited to use in a touch device having a display function. In the third embodiment, the touch structure 10 (20, 30) is used in a touch knob to improve the sensitivity of the touch knob.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A touch structure, comprising:
    a touch electrode layer, the touch electrode layer comprising a plurality of touch electrodes spaced and insulated from each other;
    an auxiliary electrode layer, the auxiliary electrode layer comprising a plurality of auxiliary electrodes spaced apart and insulated from each other; and
    a driving circuit electrically connected to the plurality of touch electrodes and the plurality of auxiliary electrodes, the driving circuit being configured to drive the plurality of touch electrodes, to detect changes of self-capacitances of the plurality of touch electrodes, and to determine touch positions according to the changes of self-capacitances;
    wherein the driving circuit is further configured to drive the plurality of auxiliary electrodes with same signals as driving signals of the plurality of touch electrodes;

each of the plurality of touch electrodes and one corresponding auxiliary electrode are electrically insulated by air.

2. The touch structure according to claim 1, wherein each of the plurality of touch electrodes at least partially overlaps one corresponding auxiliary electrode, a shape of each of the plurality of touch electrodes is the same as a shape of one corresponding auxiliary electrode.

3. The touch structure according to claim 1, wherein the touch electrode layer and the auxiliary electrode layer are made of indium tin oxide, metal mesh, nano silver wire, graphene, carbon nano Tube, copper, or aluminum.

4. A touch device, comprising a touch structure and a display panel for displaying images, the touch structure comprising:
- a touch electrode layer, the touch electrode layer comprising a plurality of touch electrodes spaced and insulated from each other;
- an auxiliary electrode layer, the auxiliary electrode layer comprising a plurality of auxiliary electrodes spaced apart and insulated from each other; and
- a driving circuit electrically connected to the plurality of touch electrodes and the plurality of auxiliary electrodes, the driving circuit being configured to drive the plurality of touch electrodes, to detect changes of self-capacitances of the plurality of touch electrodes, and to determine touch positions according to the changes of self-capacitances;
- wherein the driving circuit is further configured to drive the plurality of auxiliary electrodes with same signals as driving signals of the plurality of touch electrodes, and each of the plurality of touch electrodes and one corresponding auxiliary electrode are electrically insulated by air.

5. The touch device according to claim 4, wherein the touch structure is embedded in the display panel.

6. The touch device according to claim 4, wherein each of the plurality of touch electrodes at least partially overlaps one corresponding auxiliary electrode, a shape of each of the plurality of touch electrodes is the same as a shape of one corresponding auxiliary electrode.

7. The touch device according to claim 4, wherein the touch electrode layer and the auxiliary electrode layer are made of indium tin oxide, metal mesh, nano silver wire, graphene, carbon nano Tube, copper, or aluminum.

8. A method for driving a touch structure, wherein the touch structure comprises:
- a touch electrode layer, the touch electrode layer comprising a plurality of touch electrodes spaced and insulated from each other;
- an auxiliary electrode layer, the auxiliary electrode layer comprising a plurality of auxiliary electrodes spaced apart and insulated from each other, and each of the plurality of touch electrodes and one corresponding auxiliary electrode are electrically insulated by air; and
- a driving circuit electrically connected to the plurality of touch electrodes and the plurality of auxiliary electrodes;
- wherein the method for driving the touch structure comprises:
- applying driving signals to the plurality of touch electrodes, and simultaneously applying same signals as the driving signals to the plurality of auxiliary electrodes; and
- detecting changes of self-capacitance of the plurality of touch electrodes to determine touch positions.

\* \* \* \* \*